March 2, 1926.
M. A. MARTIN
1,575,354
PORTABLE MITER BOX
Filed Oct. 13, 1924    2 Sheets-Sheet 1
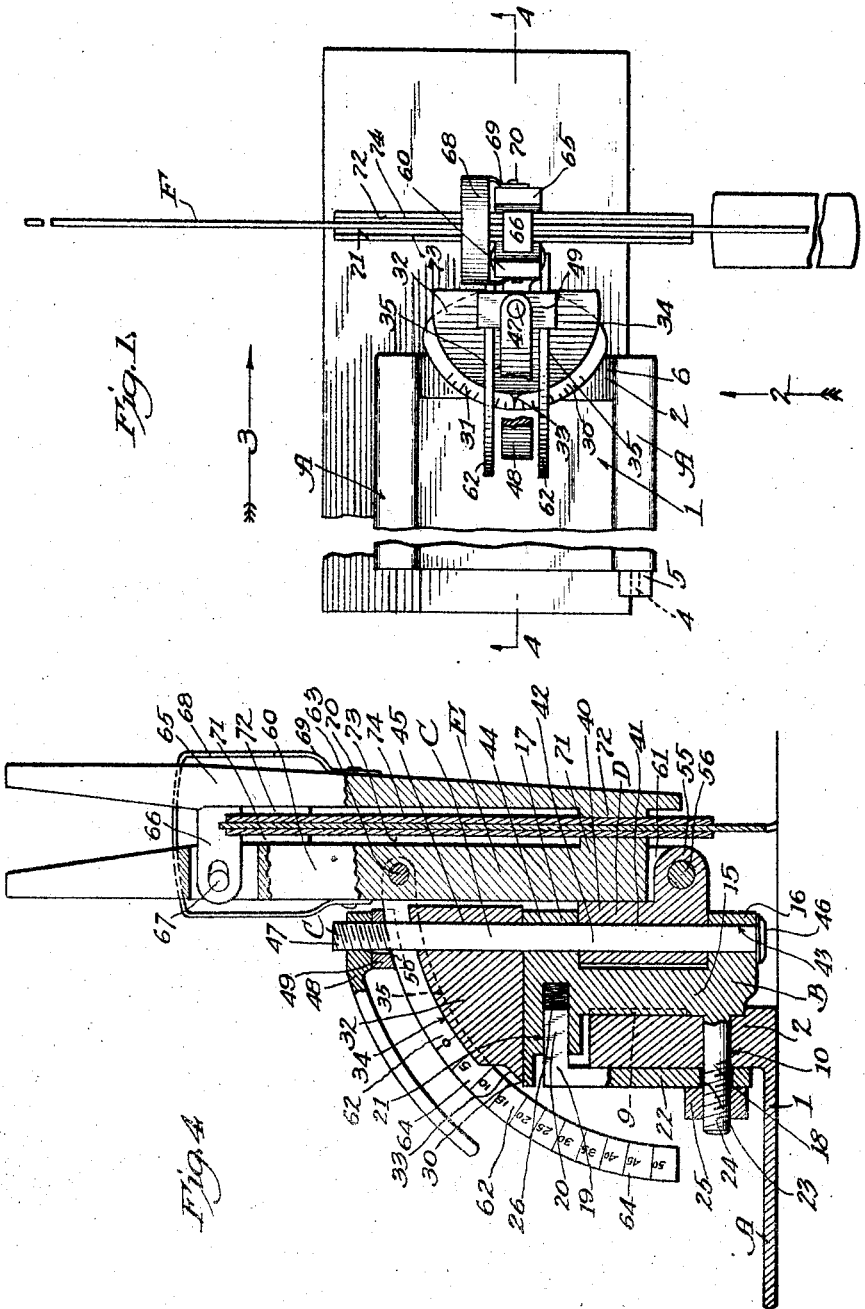
Inventor.
Morris A. Martin,
By Hazard and Miller
Attorneys March 2, 1926.
M. A. MARTIN
PORTABLE MITER BOX
Filed Oct. 13, 1924
1,575,354
2 Sheets-Sheet 2
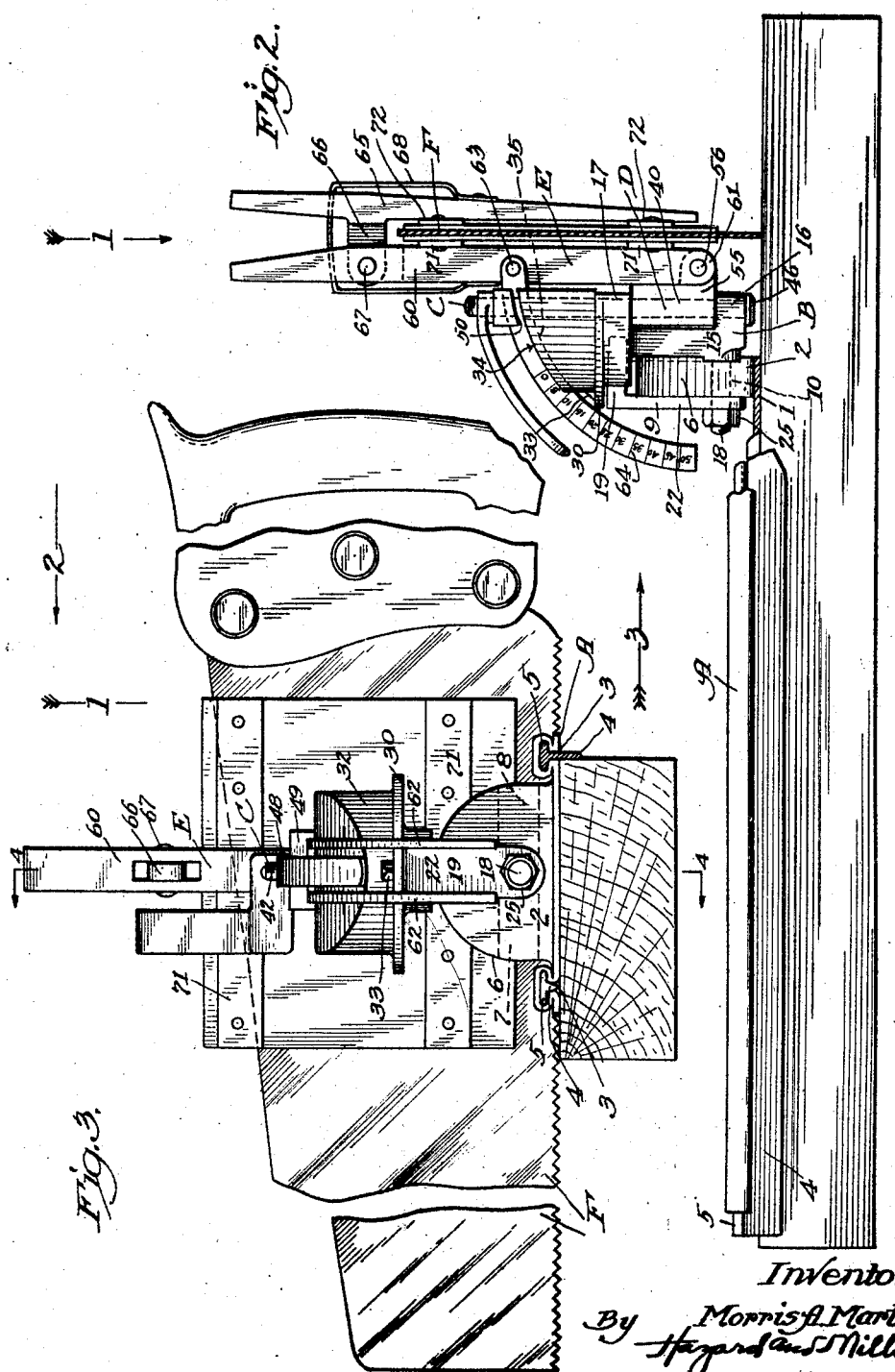
Inventor:
Morris A. Martin
By Hazard and Miller
Attorneys Patented Mar. 2, 1926.

1,575,354

UNITED STATES PATENT OFFICE.

MORRIS A. MARTIN, OF LOS ANGELES, CALIFORNIA.

PORTABLE MITER BOX.

Application filed October 13, 1924. Serial No. 743,372.

*To all whom it may concern:*

Be it known that I, MORRIS A. MARTIN, a citizen of the United States, residing at Los Angeles, in the county of Los Angeles and State of California, have invented new and useful Improvements in Portable Miter Boxes, of which the following is a specification.

My invention is an improvement in portable miter boxes of the type in which the miter box is held on or clamped to a board and is swiveled to guide a saw in cutting at the desired angle or miter.

My miter box is designed to swing the saw on say a vertical axis and to swivel it on a horizontal axis, either one of which may be used for cutting miters.

The main body is provided with grooves in which the movable part may be clamped in three different positions, or by not using or eliminating the grooves could be clamped in any position, thus giving a third adjustment for the saw.

My invention comprises a base which may be held or clamped to a board or timber, a miter guide bolted or otherwise secured thereto, a vertical pivot held in the miter guide, and a horizontal swiveling saw support pivoting on the vertical pivot. This provides a horizontal mitering guide.

I provide a vertical swiveling miter or bevel guide by mounting a saw clamp on the saw support with scales on protractor arms to indicate the angle of swivel.

Thus with my improved miter box with one implement I may cut miters and bevels at the same time and attach my miter box to a board or timber on the most convenient face to work from.

My invention will be more readily understood from the accompanying specification and drawings, in which Figure 1 is a top plan view of my miter box with a saw clamped therein and looking in the direction indicated by the arrows 1 of Figs. 2 and 3.

Fig. 2 is a side elevation of my miter box looking in the direction indicated by the arrow 2 of Fig. 1.

Fig. 3 is an end elevation of my miter box locking in the direction indicated by the arrow 3 in Fig. 2.

Fig. 4 is a cross section of the miter box on the line 4—4 of Fig. 3 viewed in the direction of the arrows.

The main parts of my miter box are the guide base A which may be held or clamped to a board or timber, a mitering guide B bolted or otherwise secured thereto, a vertical pivot C held in the mitering guide, and a horizontal swiveling saw support D swiveling on the pivot. A saw clamp E is swiveled on the saw support D.

With the parts A, B, C, and D the saw may be swung on a vertical axis to cut a miter. By swiveling the saw clamp E I can cut a bevel which may be with or without a miter cut.

The guide base A is constructed with a flat plate 1 supporting a vertical block 2 at the end. Near each edge I form grooves 3 in which may be inserted straight edges 4 having T-shaped heads 5 to engage the inside face of the grooves. The block 2 is preferably semi-circular above the plate 1 as indicated by 6, and has two horizontal grooves 7 and 8 and a vertical groove 9 for a purpose hereinafter explained. The block has an aperture 10 near the base.

The mitering guide B is in the shape of a yoke 15 having a lower lug 16 and an upper lug 17. It is securely clamped to the base A by means of a bolt or stud 18. To give additional rigidity an angle 19 engages the yoke by an arm 20 thereof which is illustrated as being rounded. This is inserted in a circular hole 21 in the yoke 15. The other arm 22 of the angle has an aperture 23 fitting over the bolt 18 which is screw threaded at 24 and provided with a nut 25. A spring 26 is inserted in the hole 21 to disengage the angle and the yoke when the nut is loosened.

The base A may be rotated on the bolt 18 which is shown as a horizontal axis secured to the mitering guide B. The grooves 7, 8 and 9 provide three positions for holding the base A and mitering guide B in fixed positions so that the device may have a convenient mounting working on the desired face of the board or timber. These grooves may be omitted and the semi-circular part of the block 2 graduated to indicate an angular adjustment.

The upper portion of the mitering guide B is provided with a quadrant 30 having a graduated face 31. This quadrant is substantially semi-circular merely having sufficient bevel to clear the saw and is for a purpose hereinafter described.

Above the quadrant and resting on the face thereof, is a loose block 32 substantially semi-circular as indicated in Fig. 1 with a pointer 33 to indicate the graduations on the quadrant. The upper face of the block 32 is curved as indicated at 34 having two grooves 35 cut therein for a purpose hereinafter indicated.

The saw support D comprises a barrel 40 held between the lugs 16 and 17 of the mitering guide B and has an aperture 41 therethrough. A pivot pin 42 passes through the apertures 43 in the lug 16, 41 in the barrel 40, 44 in the lug 17, and 45 in the block 32. It is illustrated with a head 46 at the lower end and being screw threaded 47 at the top. A hand nut 48 bears against a washer 49 illustrated as cut on a curve 50. (See Figs. 2 and 4.) The barrel 40 has a lug 55 holding a horizontal swivel pin 56. This pivot supports the saw clamp E.

The saw clamp E has a base 60 and is illustrated with two lugs 61 at the lower end engaging the swivel pin 56. Two protractor arms 62 are secured to the clamp base 60, the means illustrated being a pivot bolt 63. These arms are curved with the center 56 and may be rigidly secured to the base 60. The upper surface of the block 32 and the grooves 35 are on the same curve as the protractor arms. The protractor arms are graduated as indicated at 64, there being a zero mark on the block 32.

The clamp base supports an outer clamp arm 65 by means of arms 66 secured thereto and a pin 67 through the base 60. A bow spring 68 with two arms 69 is secured to the clamp base 60 and the outer clamp arm 65 by screws 70. It is preferable to mount the spring below the pin 67 so that if there is any wear the spring will still clamp the saw guides tightly together. As a convenient way to guide the saw in the saw clamp I provide shoulders 71 on the clamp base and shoulders 72 on the clamp arm. These support saw guides of anti-friction material 73 and 74 between which the saw F is shown clamped.

The operation of my horizontal miter is as follows:

Presuming the miter to be in the position illustrated in the drawings with the nut 25 clamped tight, the hand nut 48 is loosened sufficiently to allow the barrel 40 to rotate on the pivot pin 42. The protractor arms 62 engaging in the grooves 35 of the block 32 rotate this block with the barrel. The saw clamp carries the saw and when the scale on the quadrant 30 by means of the pointer 33 on the block 32 indicates the desired angle the hand nut 48 is tightened, thereby clamping the protractor arms, block 32, barrel 40 and saw clamp E to a fixed position. The saw F may now be operated to cut the desired miter.

The operation of my miter box acting as a vertical bevel is as follows, presuming the device to be in the position indicated in the drawings.

The hand nut 48 is loosened whereby the protractor arms 62 may slide in reference to the washer 49. The whole saw clamp E swivels around the swivel pin 56 which is horizontally mounted. When the scale 64 indicates the proper angle of bevel the hand nut 48 is clamped against the protractor arms, thereby securing the saw clamp E in a fixed position. The saw F is now operated to cut the desired bevel.

For convenience I have designated the miter as being cut on a vertical axis and the bevel on a horizontal axis, but manifestly these are only relative terms. It will thus be seen that my portable miter box may be pivoted on a vertical axis to cut a miter. It may also be independently swiveled on a horizontal axis to cut a bevel. These may be combined to cut a beveled miter. By oscillating the guide base A on the bolt 18 a third adjustment may be made. The latter however, is principally designed to position the operative parts of the miter box in a convenient position relative to the board or timber, but as before mentioned, the block 2 could be graduated to indicate an angle. I find the saw operates very easily between the anti-friction plates held by the saw clamp and when it has cut into a timber a sufficient distance the guides may still be used or not, as desired.

The several main elements which co-operate to form my portable miter box could obviously be altered, as could the details of specific parts.

Various changes may be made without departing from the spirit of the invention as claimed.

I claim:

1. A miter box having in combination a base, a vertical semi-circular block attached by a bolt thereto, a mitering guide attached to said block to turn therein, a saw support pivoting on a vertical axis held by the mitering guide, a saw clamp swiveling on a horizontal axis held by the saw support, and a single means for clamping both the saw support and the saw clamp in mitering or beveling position.

2. A miter box having in combination a guide base having a curved semi-circular block extending vertically therefrom, a mitering guide mounted on said block by a bolt therethrough to oscillate on a horizontal axis, a nut on the bolt to clamp said mitering guide in a desired position, a pin vertically mounted in said mitering guide, a saw support pivotally mounted on said pin, a saw clamp swivelly mounted on a pin attached to said saw support, protractor arms attached to said saw clamp, and means on the vertical pin to clamp the protractor arms to thereby clamp the saw clamp and the saw support.

3. In a portable miter box, a mitering guide suitably supported, a saw support pivoting thereon on a vertical axis, a saw clamp swivelling on said mitering guide on a horizontal axis, a miter scale on said mitering guide, a block loosely resting on said scale and having a semi-circular base and rounded top surface, protractor arms attached to said saw clamp, a saw guide attached to said saw clamp, means whereby on pivoting vertically or swivelling horizontally, the protractor arms, and block indicate a mitering and a bevelling angle.

4. A miter box comprising in combination a mitering guide suitably supported and having a horizontal upper surface, having a semi-circular edge with a scale thereon, a lower and upper lug integral with the mitering guide, a pivot pin extending vertically through said lugs, a block loosely resting on the upper surface of the mitering guide and being held in position by the vertical pin passing therethrough, a saw support pivoted on the vertical pin between the said lugs, a saw clamp connected to the saw support by a horizontal pivot, the upper surface of the said block having a pair of curved grooves, a pair of protractor arms pivotally connected to the saw clamp and sliding in the said grooves, a hand nut threaded on the upper end of the vertical bolt, said nut bearing against said protractor arms and forming the sole means to clamp the saw support and the saw guide when swung on either its horizontal or vertical pivots to give a bevel or a miter angle.

5. A miter box as claimed in claim 4, in which the mitering guide is swivelly mounted on a vertical semi-circular block by means of a bolt, an angular member having an arm seated in a circular hole in the mitering guide, a series of co-acting grooves on the faces of the mitering guide and the block, an arm on the angle connected to the said bolt and clamped against the block by a nut, screw threaded on the bolt.

In testimony whereof I have signed my name to this specification.

MORRIS A. MARTIN.